United States Patent [19]

Ide et al.

[11] Patent Number: 5,235,377
[45] Date of Patent: Aug. 10, 1993

[54] MEASURING APPARATUS FOR CAMERA

[75] Inventors: Masataka Ide, Tokyo; Osamu Nonaka, Sagamihara, both of Japan

[73] Assignee: Olympus Optical Co., Ltd., Tokyo, Japan

[21] Appl. No.: 826,626

[22] Filed: Jan. 28, 1992

Related U.S. Application Data

[63] Continuation of Ser. No. 827,626, Jan. 29, 1992, abandoned.

[30] Foreign Application Priority Data

Feb. 26, 1991 [JP] Japan .................................. 3-53154
Dec. 19, 1991 [JP] Japan .................................. 3-336966

[51] Int. Cl.$^5$ ............................................. G03B 13/36
[52] U.S. Cl. ............................................. 354/403
[58] Field of Search ................................... 354/403

[56] References Cited

U.S. PATENT DOCUMENTS

| | | | |
|---|---|---|---|
| 4,542,971 | 9/1985 | Nomata | 354/403 |
| 4,621,917 | 11/1986 | Kaneda | 354/403 |
| 4,629,882 | 12/1986 | Matsuda et al. | 250/210 J |
| 4,849,781 | 7/1989 | Nakazawa et al. | 354/403 |

FOREIGN PATENT DOCUMENTS 57-104809 6/1982 Japan .

Primary Examiner—Russell E. Adams
Attorney, Agent, or Firm—Frishauf, Holtz, Goodman & Woodward

[57] ABSTRACT

According to a measuring apparatus for a camera, light is projected to an object from a projection section, and light reflected on the object is received at a first light receiving section and a second light receiving section arranged to be adjacent to each other. In the first light receiving section, a first and second signals relating to a light receiving position and a quantity of received light are output, and in the second light receiving section, a third signal relating to a quantity of light of the reflected light is output. In a discriminating and calculating section, if it is discriminated that the reflected light is positioned at a place, which is nearer than a predetermined distance, a measuring distance can be calculated from an output ratio of the first signal to the second signal by a measuring calculation circuit. On the other hand, if it is discriminated that the reflected light is positioned at a place, which is farther than the predetermined distance, a measuring distance can be calculated from the output ratio of the sum of the first and second signals to the third signal by the measuring calculation circuit.

13 Claims, 11 Drawing Sheets

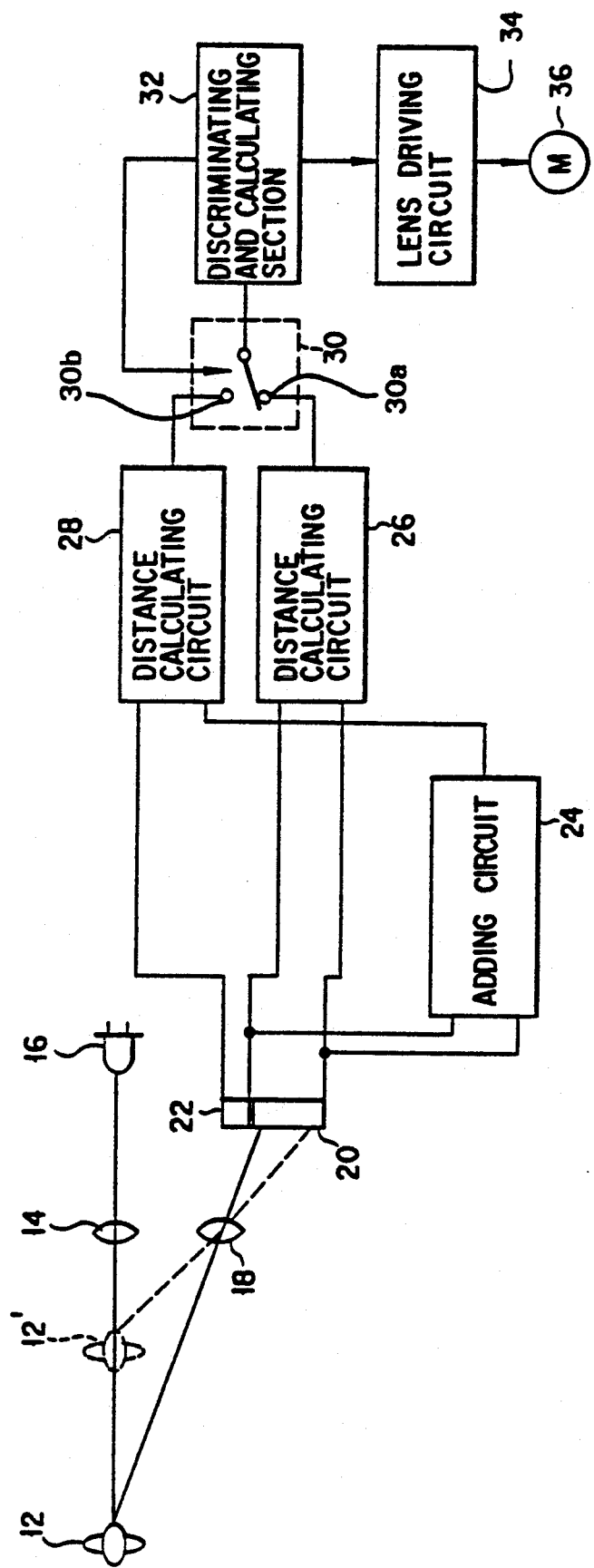
F I G. 4

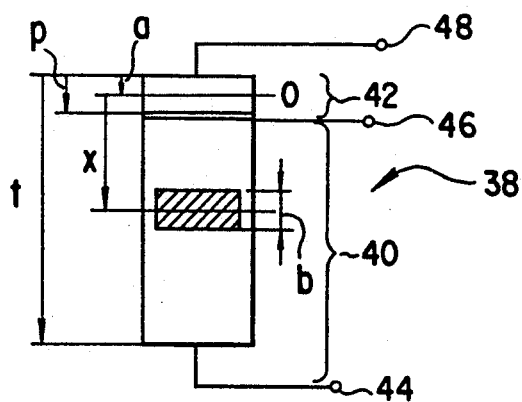
F I G. 5
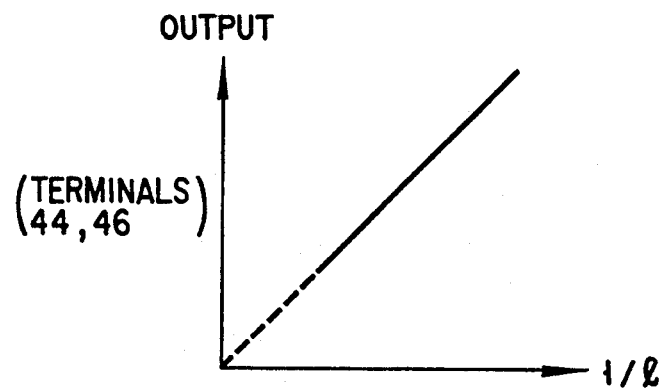
F I G. 6A
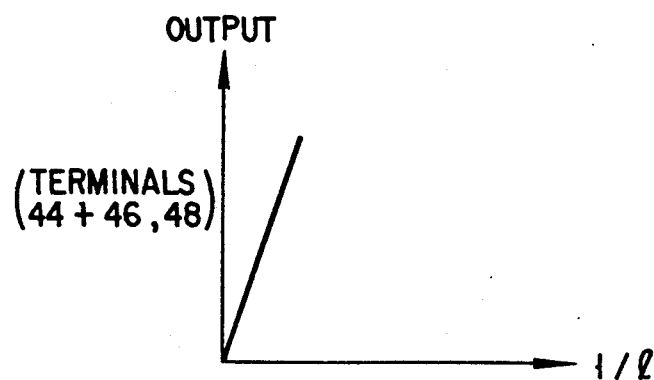
F I G. 6B

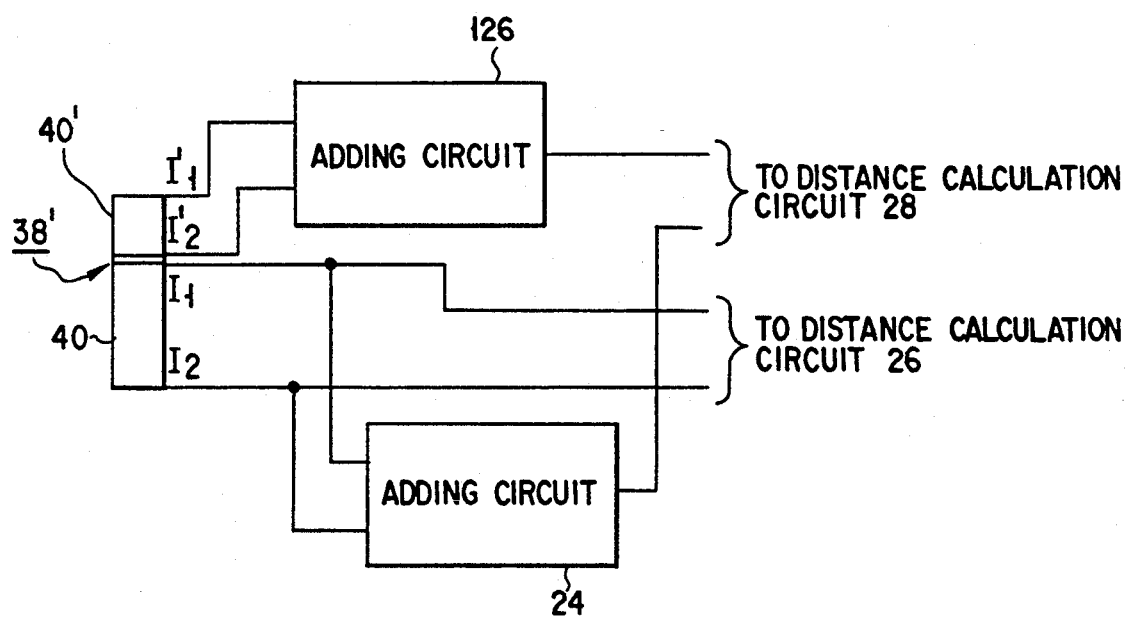
F I G. 14

MEASURING APPARATUS FOR CAMERA

This is a continuation of U.S. patent application Ser. No. 07/827,626, filed Jan. 29, 1992 which was abandoned upon the filing hereof.

BACKGROUND OF THE INVENTION

1. Field of the Invention

The present invention relates to a measuring apparatus, and more particularly, to a measuring apparatus for a camera wherein a signal is projected to an object, and an object distance is measured from an incident position of a reflected signal from the object.

2. Description of the Related Art

In general, there has been known a measuring apparatus as in FIG. 1 using an active autofocus technique of an infrared projection type. Such a measuring apparatus has been used in, for example, a compact camera, VTR, a binocular telescope, and the like. With reference to FIG. 1, light projected from an infrared light emitting diode (IRED) 2 is radiated to an object 6 via a projection lens 4. A reflected light from the object 6 is converged by a receiving light lens 8, and a spot is formed on a position detecting element 10. In this drawing, l is a distance (distance of object) between lens 4 and the object 6, S is a distance (base length) between the lens 4 and lens 8, and f is a focal distance of the lens 8. Moreover, t is a length of the position detecting element 10, and x is a distance from one end of the position detecting element 10 to a position where the reflected light is focused.

According to the above-structured measuring apparatus, if a semiconductor detection element is used as a position detection element, an inverse number $1/l$ of the distance of the object can be obtained from the following equation (1):

$$\frac{1}{l} = \frac{x}{S \cdot f} \quad (1)$$

This semiconductor position detecting element is generally called a position sensitive detector (PSD), and outputs currents $I_1$ and $I_2$ depending on a position of the center of gravity of an incident light as shown in FIG. 2A. An image $10_0$ of the light signal is formed rectangular. Here, if a total length of PSD $10_1$ is t, two current signals $I_1$ and $I_2$ can be obtained from the following equations (2) and (3):

$$I_1 = \frac{x}{t} \cdot I_p \quad (2)$$

$$I_2 = \frac{t-x}{t} \cdot I_p \quad (3)$$

In equations (2) and (3), $I_p$ denotes a total photoelectric current. Then, based on the result of the above equations (2) and (3), x can be obtained from the calculation of ratio shown in the following equation (4):

$$\frac{I_1}{I_1 + I_2} = \frac{x}{t} \quad (4)$$

There is also known a position detecting element having two photodetectors (silicon photo diode; SPD) $10_2$ and $10_3$ arranged in parallel. In this case, if a distance from an optical axis of the lens 8 of FIG. 1 to a divisional point is a p, image $10_0$ of the light signal is formed rectangular, and a length in t direction is b, the following equations (5) and (6) can be obtained:

$$I_1 = \frac{I_p\left(x + \frac{b}{2} - p\right)}{b} \quad (5)$$

$$I_2 = \frac{I_p\left\{b - \left(x + \frac{b}{2} - p\right)\right\}}{b} = \frac{\left(\frac{b}{2} + p - x\right)I_p}{b} \quad (6)$$

Then, the calculation is performed by use of these equations (5) and (6), the following equation (7) can be established:

$$\frac{I_1}{I_1 + I_2} = \frac{x}{b} - \frac{p}{b} + \frac{1}{2} \quad (7)$$

Therefore, even in a case where two SPDs $10_2$ and $10_3$ are used, x can be obtained by ratio $I_1$ and that of $I_2$ if b and p are widely well-known.

Moreover, if each of equations (4) and (7) is combined with equation (1) and the measurement using PSD is performed, the following equation (8) can be established:

$$\frac{I_1}{I_1 + I_2} = \frac{S \cdot f}{t} \cdot \frac{1}{l} \quad (8)$$

In the case of the measurement using a two-divided SPD, the following equation (9) can be established:

$$\frac{I_1}{I_1 + I_2} = \frac{S \cdot f}{b} \cdot \frac{1}{l} + \left(\frac{1}{2} - \frac{p}{b}\right) \quad (9)$$

The above equations (8) and (9) are graphed out as shown in FIGS. 3A and 3B. More specifically, FIG. 3A shows a characteristic view of the inverse number of the measuring distance of the measuring apparatus using the PSD and the output thereof; and FIG. 3B shows a characteristic view of the inverse number of the measuring distance of the measuring apparatus using the two-divided SPD and the output thereof.

In general, in a state that t=about 2 mm and b=about 0.3 mm, an inclination between the inverse number $1/l$ and the output ($I_1/(I_1+I_2)$) in the SPD measurement is about seven times larger that that in the PSD measurement. In this case, the total length t is not considered. This means that the change of the output is larger than that of the inverse number $1/l$, and that higher accuracy can be obtained. On the other hand, in the measurement using the two-divided SPD, unless a part of the spot is always mounted on both SPDs, the measurement cannot be performed. Due to this, as compared with the case of the PSD measurement, the measuring range is extremely small.

In other words, as the change of x of FIG. 1 is increased, the measurable range of l can be increased. However, in the case of b=0.3 mm, the measuring range of the SPD is only 0.3 mm if the value is converted to x. On the other hand, in the measurement of the PSD, there is a measuring range of 2 mm−0.3 mm=1.7 mm, and the measuring range of the PSD measurement is about six times larger than that of the SPD measurement even if the excess of the spot is considered.

In the SPD measurement, if the length is enlarged six times as large as the above value, it is possible to obtain the same measuring range as that of the PSD. However, the above-explained high measuring accuracy cannot be obtained.

SUMMARY OF THE INVENTION

An object of the present invention is to provide a measuring apparatus in which a measuring range does not narrow and a measuring accuracy of a long distance does not decrease.

According to the object of the present invention, there is provided an autofocus setting apparatus of a camera comprising light projecting means for projecting light to an object, first light receiving means for receiving light reflected on the object and outputting first and second signals in accordance with a light receiving position and a quantity of received light, second light receiving means, positioned adjacent to the first light receiving means, for receiving the reflected light and outputting a third signal in accordance with a quantity of receiving light, a first calculating circuit for calculating an object distance on receipt of the first and second signals, a second calculating circuit for calculating the object distance on receipt of the sum of the first and second signals, and the third signal, and driving circuit for driving a projection lens by selectively receiving the output of the first calculating circuit and that of the second calculating circuit.

Another object of the present invention is to provide an autofocus setting apparatus comprising light projecting means for projecting measuring light to an object, light receiving means for receiving the measuring light reflected on the object, the light receiving means having a first photodetector outputting first and second signal currents whose ratio to an absolute value changes in accordance with the object distance and a second photodetector, positioned adjacent to the first photodetector, outputting a third signal current in accordance with a quantity of receiving light of the reflected light, adding means for adding the first and second signal current and outputting a signal current corresponding to the total amount of receiving light of the first photodetector, first outputting means for outputting first object distance information based on the ratio of the first signal current to the second signal current, second outputting means for outputting second object distance information based on the ratio of the third signal current to the signal current from the adding means, selecting means for selecting the first object distance information when the object distance obtained by the first outputting means is shorter than a predetermined distance, and selecting the second distance information when the object distance obtained by the first outputting means is longer than a predetermined distance, and lens driving means for driving a focus of a projection lens to be adjusted in accordance with distance information of the object selected by the selecting means.

More specifically, in the autofocus setting apparatus of infrared projecting light type, as the object distance increases (long distance), the reflected signal light weakens. Due to this, if the PDS is used as a photodetector, S/N ratio is deteriorated, and the measuring accuracy worsens. On the other hand, in the case of the measuring system using the PSD in the short distance, since sufficient S/N ratio can be obtained, there is no problem in the measuring accuracy. Therefore, according to the present invention, the PSD measurement is performed in the short distance and the SPD measurement is performed in the long distance. Thus autofocusing having high accuracy and a wide range can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 4 is a block diagram showing an optical system of a measuring apparatus of a first embodiment of the present invention and an electrical circuit thereof;

FIG. 5 is a view showing a photodetector to be used in the present invention;

FIG. 6A is a characteristic view of the output, which can be obtained from both ends of the PSD of FIG. 5;

FIG. 6B is a characteristic view of the output, which can be obtained from the PSD of FIG. 5 and three terminals of SPD;

FIG. 14 shows a fifth embodiment of the present invention, and illustrates the photodetector and a part of the the peripheral portion.

DETAILED DESCRIPTION OF THE PREFERRED EMBODIMENTS

Figure 1:
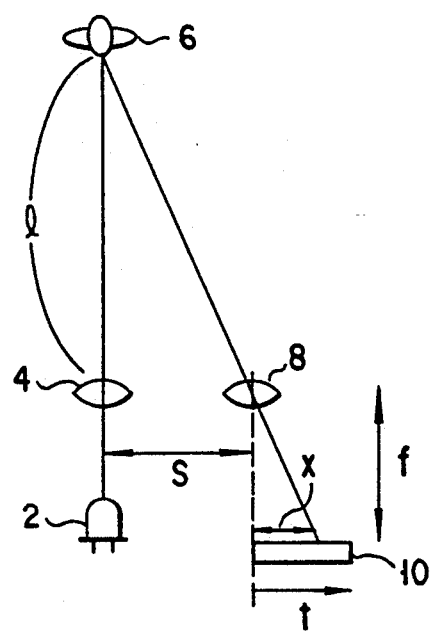
FIG. 1 is a view showing an active autofocus technique of infrared projecting light type, which is used in the conventional measuring apparatus.
Figure 2A:
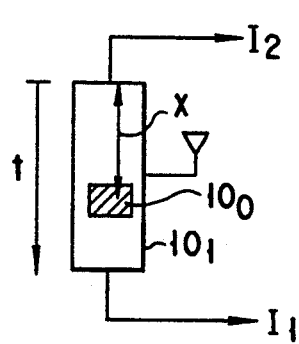
FIG. 2A is a view showing a PSD as a conventional light position detecting element.
Figure 2B:
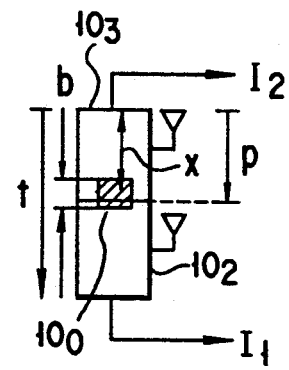
FIG. 2B is a view showing two SPDs arranged in parallel as conventional light position detecting elements.
Figure 3A:
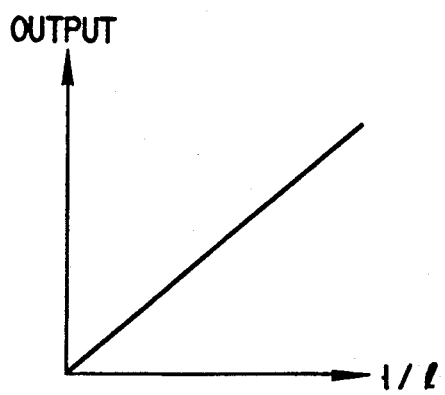
FIG. 3A is a characteristic view of the output of the PSD of FIG. 2A.
Figure 3B:
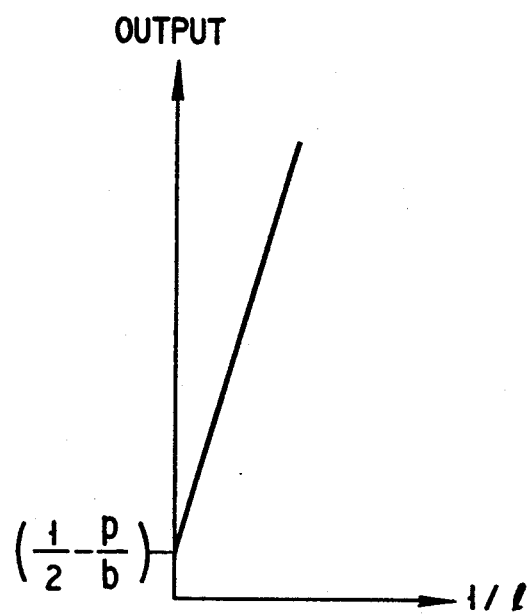
FIG. 3B is a characteristic view of the output of the SPD of FIG. 2B.

The embodiments of the present invention will be explained with reference to the drawings.

FIG. 4 is a view showing the first embodiment of the measuring apparatus according to the present invention. In this drawing, the measuring apparatus comprises a light projecting section 16 projecting light to an object 12 via a projection lens 14, and first and second receiving sections 20 and 22 arranged to be adjacent to each other and receiving light reflected on the object 12 via a light receiving lens 18. The measuring apparatus further comprises an adding circuit 24 and a first distance calculating circuit 2 to which a first and a second signal relating to a light receiving position and the amount of the received light are respectively input, a second distance calculating circuit 28 to which a third signal relating to the amount of the reflected light received at a second right receiving section 22 and an output of the adding circuit 24, and a switch 30 selectively discriminating the outputs of the first and second distance calculating circuits 26 and 28 and transmitting the outputs to a discriminating and calculating section 32. The switch 30 is normally positioned at a terminal 30a, and the position of the switch 30 is changed to a terminal 30b in accordance with an output of the discriminating and calculating section 32. Reference numeral 34 is a lens driving circuit for driving a motor 36.

In the above-structured measuring apparatus, if light is projected from the light projecting section 16 to the object 12 via the projection lens 14 in accordance with a release button pressing operation of the camera, the reflected light from the object 12 is received at the first and second light receiving sections 20 and 22 via the light receiving lens 18.

At this time, as is obvious from the drawing, if the object distance (object 12') is short, the reflected light is projected on the first light receiving section 20 as shown in a dotted line. On the other hand, if the object distance (object 12) is long, the reflected light is projected to the position between the first and second light receiving sections 20 and 22 as shown by a solid line. The distance calculation circuit 26 calculates the object distance from the output signal ratio of the first signal to the second signal from the first receiving section 20. On the other hand, the distance calculation circuit 28 calculates the object distance from the ratio of the output of the adding circuit 24, which prepares the sum of the first and second signals, to the output of the third signal from the second light receiving section 22. At the beginning of the release button pressing operation, the switch 30 is positioned at the terminal 30a, so that object distance data calculated by the distance calculation circuit 26 is transmitted to the discriminating and calculating section 32. The discriminating and calculating section 32 determines whether or not the object distance data is a longer distance than a predetermined distance. If it is determined that distance data is not longer in distance, the lens driving circuit 34 is operated based on such data. If it is determined that distance data is longer than the predetermined distance, the switch 30 is changed to the terminals 30b, and object distance data is fetched from the distance calculation circuit 28, and the lens driving circuit 34 is operated based on such data.

The photodetector to be used in the present invention will be explained.

FIG. 5 shows the structure of the photodetector to be used in the present invention. A photodetector 38 is structured by that a PSD 40 and an SPD 42 are arranged to be adjacent to each other and crosstalk is not generated. Reference numerals 44, 46, and 48 are output terminals, t: a length of photodetector 38, a: a quantity of shift, b: a diameter of spot, p: a length of SPD 42, and x: a distance excepting the quantity of shift a from the distance, which is from one end to the position where the light is reflected. In this case, the quantity of shift a is the quantity of shifting the photodetector 38 against the optical axis of the receiving lens 18 for the reason explained below. According to the above-structured photodetector 38, in the measurement of the short distance, the output can be obtained by use of a signal appearing at output terminals 44 and 46 as shown in FIG. 6A. In this case, the output 48 is not used. In the measurement of the long distance, the sum of the output terminals 44 and 46 and the signal of the output terminal 48 are used. In this case, the measuring output has a characteristic as shown in FIG. 6B. In other words, in the measurement of the long distance, the output terminals 44 and 46 are shorted, thereby PSD 40 is used as one SPD.

Then, in order to ensure linearity of the measurement output up to an infinite position, it is required that a spot not deviate from the light receiving surface when the spot is at the infinite position. Therefore, if the amount of shift $a \geq (b/2)$, the following equation (11) must be established from the following equation (10):

$$\frac{1}{2} - \frac{p-a}{b} = 0 \tag{10}$$

$$2(p-a) = b \tag{11}$$

Moreover, if SPD 42 is used till the measurement distance is 3 m, it is necessary to satisfy the following equation (12).

$$\frac{S \cdot f}{3m} - \frac{b}{2} = p - a \tag{12}$$

Then, the following equation (13) is required from the equations (11) and (12):

$$\frac{S \cdot f}{3m} = p - a + \frac{b}{2} = b \tag{13}$$

If the spot diameter d is 0.3 mm, the following relation must be satisfied.

$$S \cdot f = 3000 \times 0.3 = 900 \ mm^2$$

For example, the above relation may be established under a condition that f=20 mm and S=45 mm.

Figure 7:
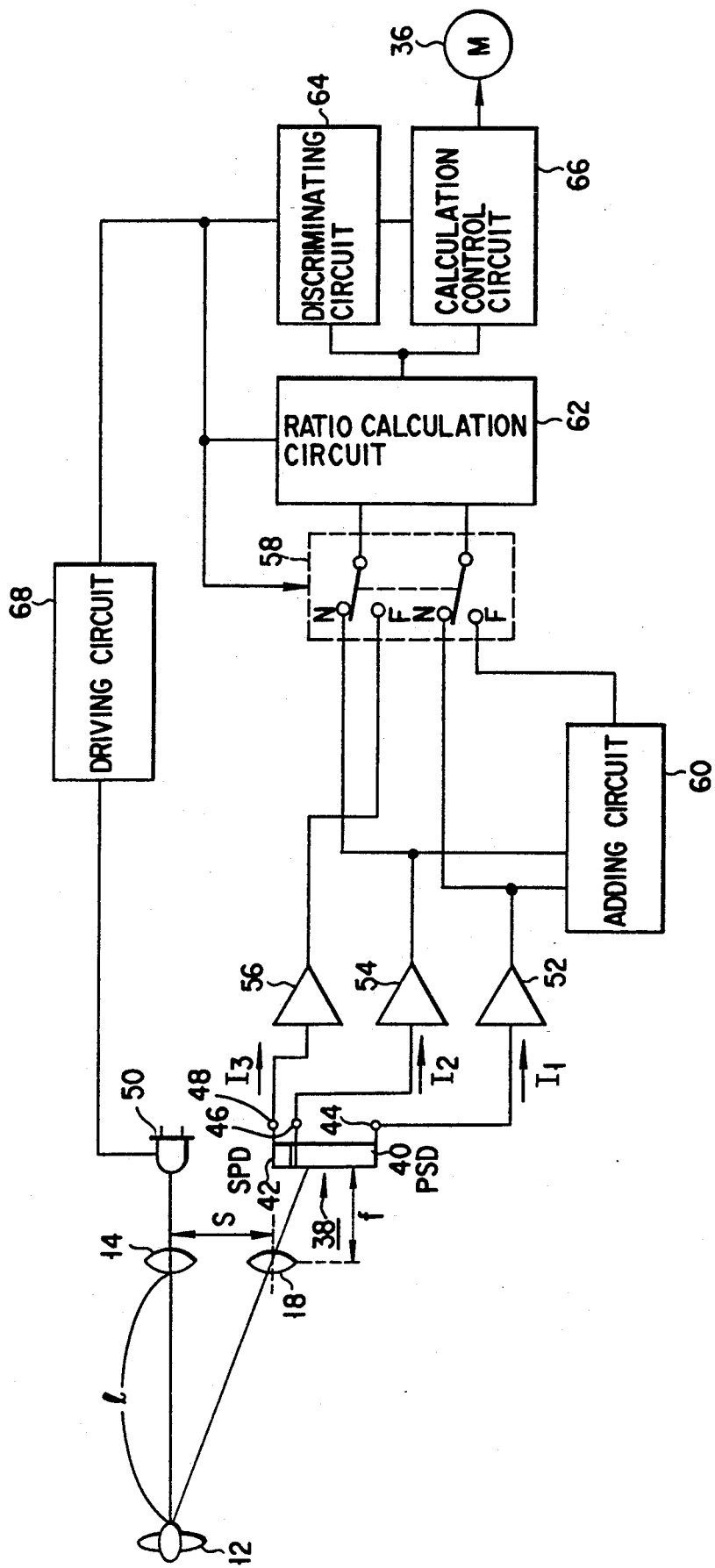
FIG. 7 is a structural view schematically showing the measuring apparatus of the present invention in which the photodetector of FIG. 5 is incorporated.

FIG. 7 shows a second embodiment of the present invention. In the second embodiment, since the same reference numerals as the first embodiment are added to the same members as the first embodiment, the explanation thereof is omitted.

In the drawing, reference numeral 50 is an IRED as projection section 16. Preamplifiers 52, 54, and 56 are connected to the output terminals 44, 46, and 48, respectively. These preamplifiers receive a photo-electric current at low input impedance and amplify the current. The outputs of these preamplifiers 52, 54 and 56 are transmitted to the terminal in a switch 58 as shown in the drawing. The outputs of the preamplifiers 52 and 54 are also supplied to the switch 58 via an adding circuit 60. The switch 58 is connected to a discriminating circuit 64 and a calculation control circuit 66 via a ratio calculation circuit 62. The discriminating circuit 64 discriminates the selection of the change of the terminal of the switch 58 in accordance with the ratio calculation obtained by the ratio calculation circuit 62, and turns on the IRED 50. A calculation control circuit 66 controls the lens driving motor 36 based on the result of the calculation. S denotes a base length of the projection lens 14 and the light receiving lens 18, and f denotes a focal distance of the light receiving lens 18.

The switch 58 is normally connected to the N side shown in FIG. 7, and changed to the F side when receiving an output from the discriminating circuit 64.

The operation of the above embodiment will be explained as follows.

First, the driving circuit 68 is driven by receiving the pressing operation of the release button of the camera, and IRED 50 is turned on. Then, two signals are supplied to the ratio calculation circuit 62 from the output terminals 44 and 46 of the PSD 40 via the preamplifiers 52 and 54 and the switch 58 based on the output currents $I_1$ and $I_2$ of both ends of PSD 40.

Object distance data obtained by the ratio calculation circuit 62 is sent to the discriminating circuit 64, and discriminates whether or not object distance data is longer than the predetermined distance, for example, 3 mm. If it is discriminated that object distance data is not longer than the predetermined distance, the calculation control circuit 66 receives object distance data, and drives the lens driving motor 36 as required. On the other hand, if it is discriminated that object distance data is longer than the predetermined distance, IRED 50 is turned on again via the driving circuit 68, and the switch 58 is changed to the F side. A signal $(I_1+I_2)$ where two currents $I_1$ and $I_2$ of PSD 40 are added and an output signal $I_3$ of SPD 42 amplified by the preamplifier 56 are calculated in the form of $(I_1+I_2+I_3)$.

In FIG. 5 a ratio calculation of $I_1/(I_1+I_2)$ can be expressed by the following equations (14) and (15):

$$\frac{I_1}{I_1+I_2} = \frac{x-p+a}{t-p} = \frac{S\cdot f}{t-p}\cdot\frac{1}{l} + \frac{a-p}{t-p} \quad (14)$$

where $$\frac{b}{2}+p-a \leq x \leq -\frac{b}{2},\ \frac{\frac{b}{2}+p-a}{S\cdot f} \leq \frac{1}{l} \leq \frac{t-\frac{b}{2}}{S\cdot f}$$

$$\frac{I_1}{I_1+I_2} = \frac{x-p+a+\frac{b}{2}}{2(t-p)} = \frac{S\cdot f}{2(t-p)}\cdot\frac{1}{l} \quad (15)$$

where $$0 \leq x \leq \frac{b}{2}+p-a,\ 0 \leq \frac{1}{l} \leq \frac{\frac{b}{2}+p-a}{S\cdot f}$$

Similarly, a ratio calculation of $(I_1+I_2)/(I_1+I_2+I_3)$ can be expressed by the following equation (16):

$$\frac{I_1+I_2}{I_1+I_2+I_3} = \frac{x-p+\frac{b}{2}+a}{b} = \frac{x}{b} + \frac{a-p}{b} + \frac{1}{2} \quad (16)$$

$$= \frac{S\cdot f}{b}\cdot\frac{1}{l}$$

where $$0 \leq x \leq \frac{b}{2}+p-a,\ 0 \leq \frac{1}{l} \leq \frac{\frac{b}{2}+p-a}{S\cdot f}$$

As mentioned above, in the short distance $[(1/l) \geq \{b/(S\cdot f)\}]$ the ratio calculation of $I_1/(I_1+I_2)$ expressed by the equation (14) is used, and an output, which is proportional to the inverse number of the effective length of PSD 40 $(t-p)$, can be obtained. On the other hand, in the long distance $[(1/l) \leq \{b/(S\cdot f)\}]$, the ratio calculation of $(I_1+I_2)/(I_1+I_2+I_3)$ expressed by the equation (16) is used, and an output, which is proportional to the inverse number of the spot diameter b, can be obtained. If the above-mentioned constants are used, $b=0.3$ mm and $t-p=1.85$, so that the relation between the short distance, that is, the equation (14) and the long distance, that is, an inclination ratio of $[1/(t-p)]/(1/b)$ based on the equation (16) is about 0.16. In other words, the inclination in the long distance is about six times larger that than in the short distance. Moreover, the total measuring range is 0.3 mm by the SPD 42, and $1.85-0.3=1.55$ (mm) by the PSD 40, so that $0.3+1.55=1.85$ (mm). Therefore, the same result as the case of the measuring apparatus formed of only the conventional PSD can be obtained.

As mentioned above, PSD and SPD are arranged to be adjacent to each other as shown in FIG. 5, the ratio calculation is performed by the PSD 40 in measuring the short distance, and the ratio calculation is performed by the SPD 42 in measuring the long distance. Thereby, the measuring apparatus having high accuracy and a wide measuring range can be realized.

A third embodiment of the present invention will be explained.

Figure 8:
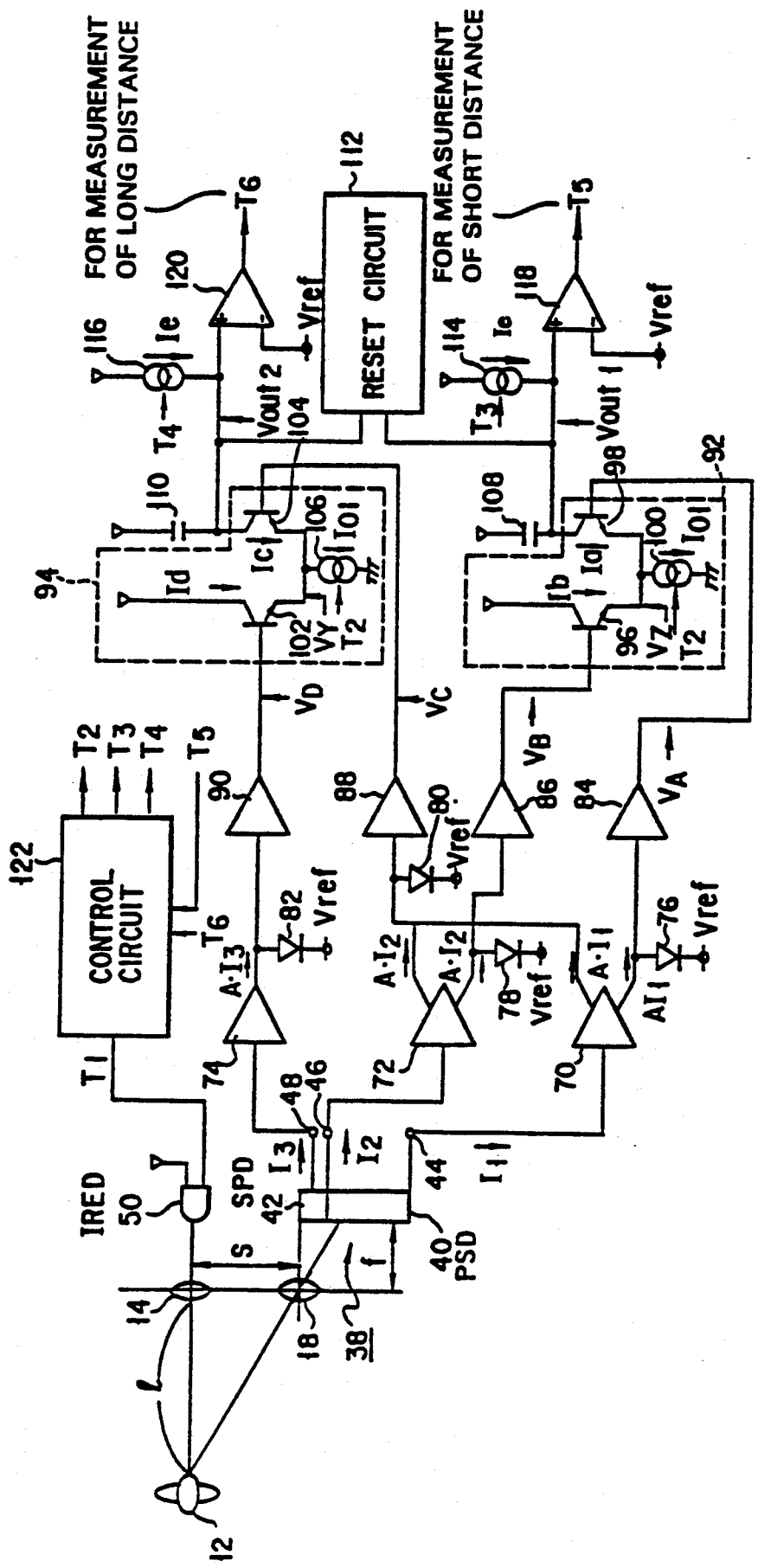
FIG. 8 is a view showing the optical system and the electrical circuit of the measuring apparatus of the present invention, which is applied as a measuring apparatus for measuring a distance from the camera.

FIG. 8 is a view showing an optical system of the measuring apparatus of the camera and electrical circuits. In FIG. 8, infrared light emitted from IRED 50 for measurement is converged by the projection lens 14, and radiated to the object 12. The reflected light from the object 12 is converged by the light receiving lens 18 arranged to be separated from the projection lens 14 by base length S. Then, the converged light is made incident on the photodetector 38, which is arranged in the direction of the base length to be separated from the light receiving lens 18 by focal distance f. In this case, the incident light is made incident on PSD 40 or SPD 42, or both as mentioned above, photoelectric currents $I_1$, $I_2$, and $I_3$ are generated in accordance with the incident position.

Preamplifiers 70, 72, and 74, which are respectively connected to the output terminals 44, 46, and 48 of the light emitting element 38, output a current, which is amplified after receiving the output signal of the photodetector 38 with low input impedance. The preamplifiers 70 and 72 have two outputs and output the same currents. Moreover, compressive diodes 76, 78, 80, and 82 compress the output currents of the preamplifiers 70, 72, and 74. More specifically, the compressive diode 76 compresses the output current $I_1$ of the preamplifier 70, the compressive diode 78 compresses the output current $I_2$ of the preamplifier 72, and the compressive diode 82 compresses the output current $I_3$ of the preamplifier 74. A current $I_1+I_2$ where both output current $I_1$ of the preamplifier 70 and the output current $I_2$ of the preamplifier 72 are added flows in the compressive diode 80, and a compressive voltage is output to both ends of the compressive diode 80.

The obtained compressive voltage is supplied to differential calculation circuits 92 and 94 via buffers 84, 86, 88, and 90. The differential calculation circuit 92 comprises NPN transistors 96 and 98, and a current source 100 as shown in the drawing. Similarly, the differential calculation circuit 94 comprises NPN transistors 102 and 104, and a current source 106.

Integral capacitors 108, 110, and a reset circuit 112, which initiates these integral capacitors 108 and 110, are connected to the differential calculation circuits 92 and 94, respectively. Also, current sources 114 and 116 are connected to the differential calculation circuits 92 and 94, respectively. Moreover, a control circuit 122 is connected to the differential calculation circuits 92 and 94 via comparators 118 and 120, respectively. The control circuit 122 also controls the operation of the IRED 50.

The operation of the differential calculation circuits 92 and 94 will be explained in detail as follows.

In this case, an amplification factor of each of preamplifiers 70, 72, and 74 is expressed by A. In the circuits shown in FIG. 8, the following equations (17), (18), (19) and (20) can be established:

$$V_A = V_T \ln \frac{I_a}{I_S} + V_Z = V_{ref} + V_T \ln \frac{A \cdot I_1}{I_S} \tag{17}$$

$$V_B = V_T \ln \frac{I_b}{I_S} + V_Z = V_{ref} + V_T \ln \frac{A \cdot I_2}{I_S} \tag{18}$$

$$V_C = V_T \ln \frac{I_b}{I_S} + V_Y = V_{ref} + V_T \ln \frac{A(I_1 + I_2)}{I_S} \tag{19}$$

$$V_D = V_T \ln \frac{I_d}{I_S} + V_Y = V_{ref} + V_T \ln \frac{A \cdot I_3}{I_S} \tag{20}$$

wherein $I_S$ shows a saturation current in an opposite direction of NPN transistors 96, 98, 102, 104, and the compressive diodes 76, 78, 80, and 82, and $V_T$ shows a thermal voltage. Also, the following equations (21) and (22) are established between $I_a$ and $I_b$ and between $I_c$ and $I_d$.

$$I_a + I_b = I_{01} \tag{21}$$

$$I_c + I_d = I_{01} \tag{22}$$

Therefore, the following equation (23) can be obtained from the equations (17), (18), and (21):

$$I_a = \frac{I_1}{I_1 + I_2} \cdot I_{01} \tag{23}$$

Also, the following equation (24) can be established form the equations (19), (20) and (22):

$$I_c = \frac{I_1 + I_2}{I_1 + I_2 + I_3} \cdot I_{01} \tag{24}$$

Therefore, the following equation (25) can be obtained form the equations (14) and (23):

$$I_a = \left( \frac{S \cdot f}{t - p} \cdot \frac{1}{l} + \frac{a - p}{t - p} \right) I_{01} \tag{25}$$

where $$\frac{\frac{b}{2} + p - a}{S \cdot f} \leq \frac{1}{l} \leq \frac{t - \frac{b}{2}}{S \cdot f}.$$

Also, the following equation (26) can be obtained from the equations (15) and (23):

$$I_a = \frac{S \cdot f}{2(t - p)} \cdot \frac{1}{l} \cdot I_{01} \tag{26}$$

wherein $$0 \leq \frac{1}{l} \leq \frac{\frac{b}{2} + p - a}{S \cdot f}$$

Moreover, the following equations (27) and (28) can be obtained from the equations (16) and (24):

$$I_c = \frac{S \cdot f}{b} \cdot \frac{1}{l} \cdot I_{01} \tag{27}$$

wherein $$0 \leq \frac{1}{l} \leq \frac{\frac{b}{2} + p - a}{S \cdot f}$$

$$I_c = I_{01} \tag{28}$$

wherein $$\frac{\frac{b}{2} + p - a}{S \cdot f} \leq \frac{1}{l} \leq \frac{t - \frac{b}{2}}{S \cdot f}$$

Figure 9:
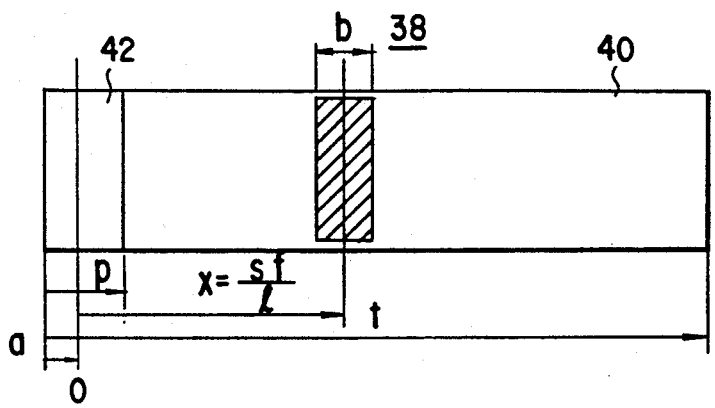
FIG. 9 is a view showing the arrangement of the photodetector of FIG. 5.
Figure 10A:
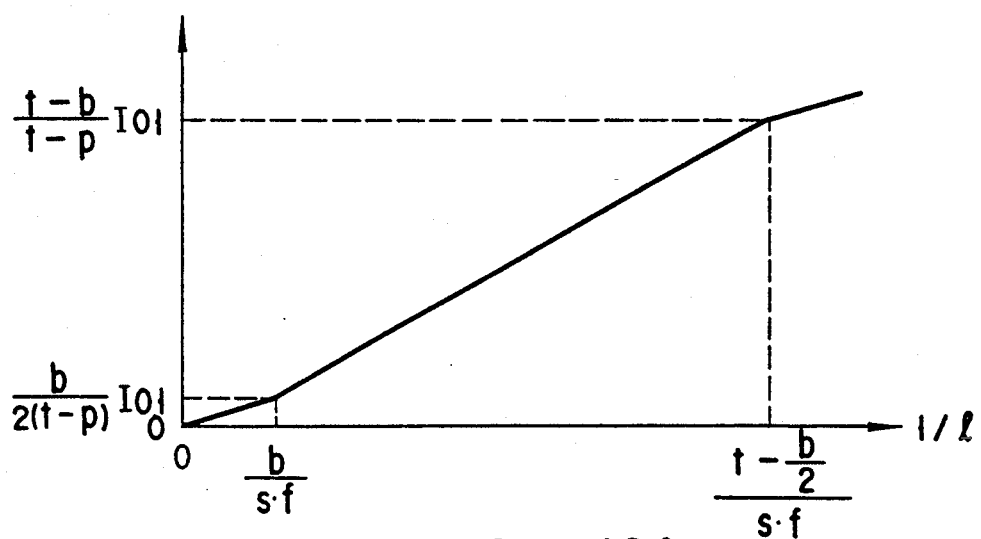
FIG. 10A is a characteristic view of $I_a$ to an inverse number $1/l$ of the object distance corresponding to the photodetector of FIG. 9.
Figure 10B:
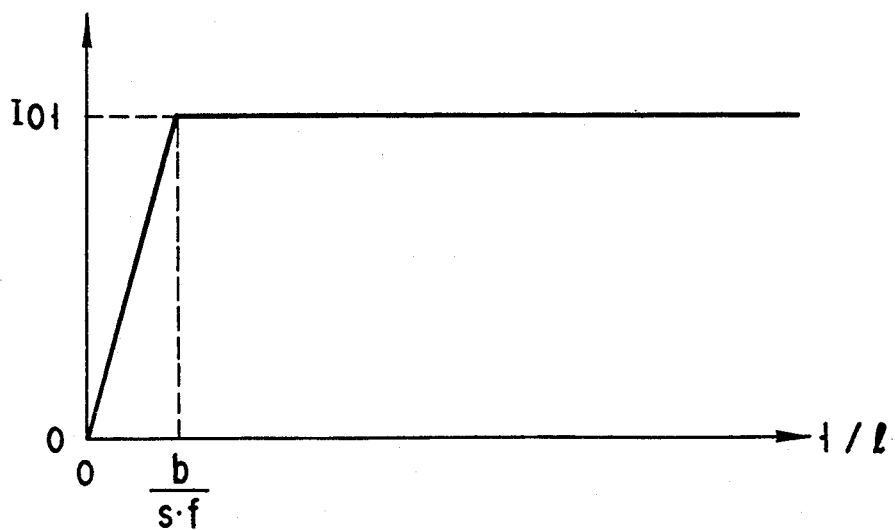
FIG. 10B is a characteristic view of $I_c$ to the inverse number $1/l$ of the object distance corresponding to the photodetector of FIG. 9.

FIG. 9 and FIGS. 10A and 10B show the photodetector 38 and its characteristic view. More specifically, FIG. 9 is a view showing an arrangement of the photodetector 38 having the structure shown in FIG. 5. FIG. 10A is a characteristic view of $I_a$ against the inverse number 1/l of the object distance corresponding to the photodetector 38 of FIG. 9. Also, FIG. 10B is a characteristic view of $I_c$ against the inverse number 1/l of the object distance corresponding to the photodetector 38 of FIG. 9. According to these characteristic views, the characteristic between b/(S·f) and (t−(b/2))/S·f shown in FIG. 10A is suitable for the short distance measuring, and the characteristic of b/S·f or less shown in FIG. 10B is suitable for the long distance measuring.

As mentioned above, the object distance can be obtained by the outputs of the differential calculation circuits 92 and 94.

Figure 11:
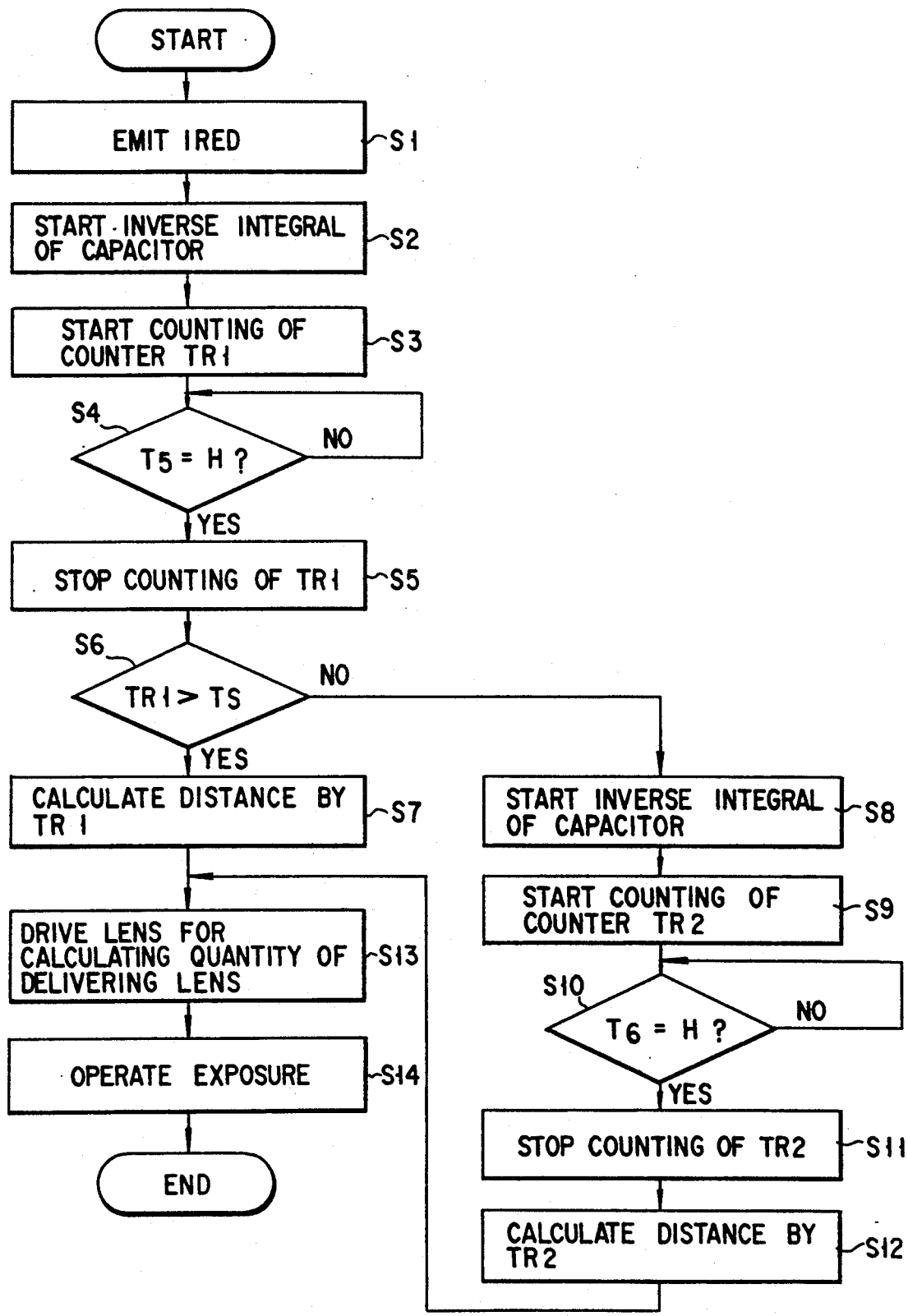
FIG. 11 is a flow chart explaining the operation of the measuring apparatus of FIG. 8.

The operation of the measuring apparatus will be explained with reference to a flow chart of FIG. 11 and a timing chart of FIGS. 12A through 12J.

Figure 12:
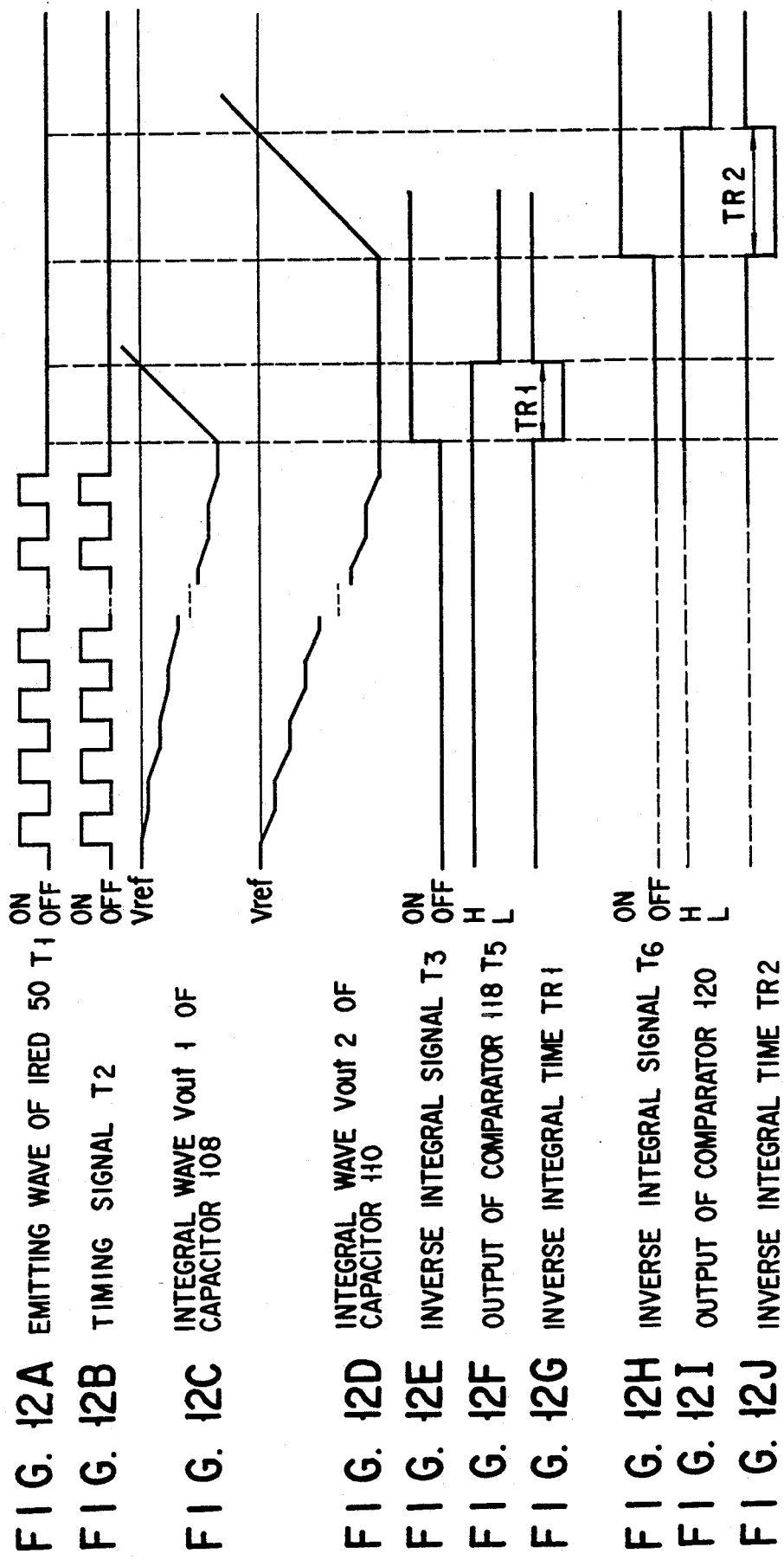
FIGS. 12A, 12B, 12C, 12D, 12E, 12F, 12G, 12H, 12I, and 12J are a timing chart explaining the operation of the measuring apparatus of FIG. 8.

First of all, current sources 100 and 106 are turned on or off in accordance with a timing signal $T_2$ of a control circuit 122. The current sources 100 and 106 are turned on only for a period of time when the IRED 38 is emitting (Step S1). Thereby, currents $I_a$ and $I_c$ are integrated in integration capacitors 108 and 110, respectively (FIGS. 12C and 12D). If a predetermined times of integration is ended, an inverse integral signal is output to a current source 114 from the control circuit 122 (FIG. 12E). If the current source 114 is turned on, an inverse integration is performed, that is, the integration capacitor 108 is discharged by a constant current $I_e$ (Step S2).

At the same time, a counter (TR1) (not shown) is started by the control circuit 122 (Step S3), and it is discriminated whether or not an output $T_5$ of a comparator 118 is in a high level (H level) (Step S4). Then, the counter TRI continues counting till the output $T_5$ of the comparator 118 is changed from the high level (H level) to the low level (L level) (Step S5). If an integral voltage $V_{OUT1}$ of the integration capacitor 108 is higher than a reference voltage $V_{ref}$, the output of the comparator 118 is changed from the H level to the L level. In this way, the output $V_{OUT1}$ in accordance with the object distance corresponding to the output current $I_a$ of differential calculation circuit 92 can be obtained as a count value of an inverse integral time TR1 in the control circuit 122. Then, in the control circuit 122, a predetermined value $T_S$ and the count value TR1 are compared with each other (Step S6). If it is discriminated in step S6 that the object 12 is positioned at the short distance, the measuring distance is calculated based on the count value TRI (step S7). If it is discriminated in step S6 that the object 12 is positioned at the long distance, the operation for obtaining the output current $I_c$ of the differential calculation circuit 94 is performed.

If an inverse integral signal $T_4$ is the current source 116 from the control circuit 122 (FIG. 12H), the current source 116 is turned on, and the integration capacitor 110 is discharged by the constant current $I_e$ (Step S8). At the same time, in the control circuit 122, a counter (TR2) (not shown therein) is started (step S9), and it is discriminated that an output $T_6$ of the comparator 120 is in the H level (step S10). The counter TR2 continues counting till the output T6 of the comparator 120 is changed from the H level to the L level (Step S11) as shown FIG. 12I. If an integral voltage $V_{OUT2}$ of the integration capacitor 110 is higher than the reference voltage $V_{ref}$, the output of the comparator 120 is changed from the H level to the L level. In this way, the output $V_{OUT2}$ in accordance with the object distance corresponding to the output current $I_c$ of the differential calculation circuit 94 can be obtained a count value of an inverse integral time TR2. Thus, the calculation of the measuring distance is performed based on the count value TR2, so that the object distance can be obtained (step S12).

After obtaining the object distance, the quantity of delivering the lens is calculated based on the obtained object distance, and the lens is driven to an appropriate position by a lens driving system (not shown) (step S13). Thereafter, an exposing operation, which is necessary for projection, is performed (step S14), and a series of operation is ended.

Figure 13:
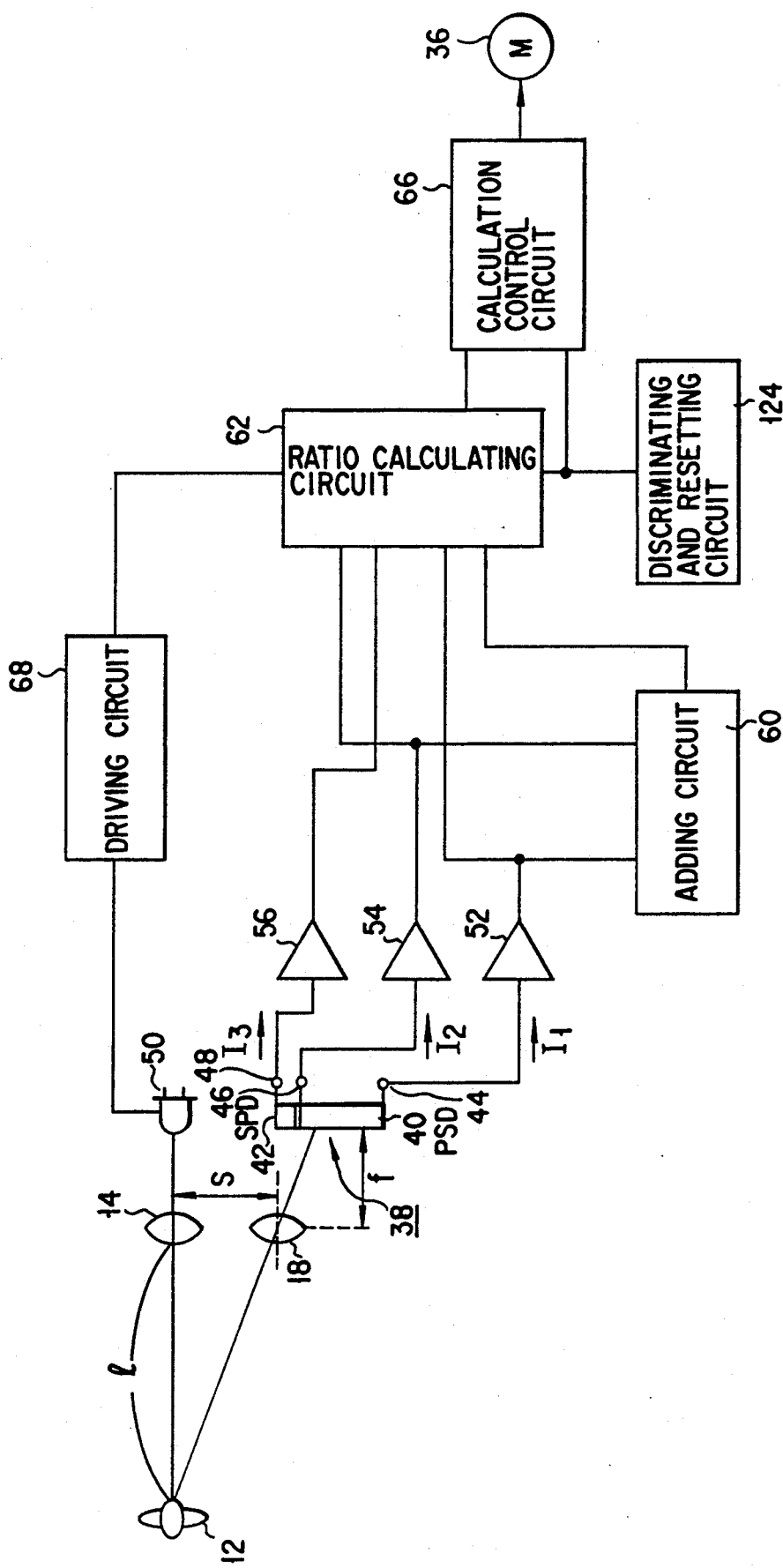
FIG. 13 shows a fourth embodiment of the present invention, and illustrates the optical system and the electrical circuit of the measuring apparatus, which is applied as a measuring apparatus for measuring a distance from the camera.

FIG. 13 shows a fourth embodiment of the present invention. In FIG. 13, amplifying outputs of $I_1$, $I_2$, and $I_3$ to be amplified by preamplifiers 52, 54, and 56 are input to the ratio calculating circuit 62. Also, the outputs of the preamplifiers 52 and 54 are input to the adding circuit 60. Moreover, in performing the release button pressing operation, the IRED 50 is turned on by the driving circuit 68, which drives for a predetermined short period of time. In pressing the release button, the ratio calculation circuit 62 performs the ratio calculating operation based on the outputs of the preamplifiers 52 and 54, so that first object distance data is calculated.

If object distance data is not longer than a predetermined distance, a discriminating and reset circuit 124 transmits the above object distance data to the calculation control circuit 66 from the ratio calculation circuit 62. If object distance data is longer than the predetermined distance, the discriminating and reset circuit 124 resets object distance data. The driving circuit 68 drives for a short period of time again after receiving a reset signal, so that the IRED 50 is turned on. The ratio calculation circuit 62 performs the ratio calculating operation based on the output of the adding circuit 60 and the output of the preamplifiers 56, so that second object distance data is calculated. The calculation control circuit 66 operates the lens driving motor 36 based on second object distance data.

As mentioned above, even if the object distance is the long distance, it is possible to perform the measurement having high accuracy and a wide range.

In the above-mentioned embodiments, there is used the photodetector 38 having the structure in which the PSD 40 and the SPD 42 are arranged to be adjacent to each other. However, as shown in FIG. 14, there may be used a photodetector 38' having the structure in which a PSD $40_1$ and a SPD $40_2$ are arranged to be adjacent to each other. In this case, the output currents $I_1$ and $I_2$ of both ends of the PSD 40 are output to the distance calculating circuit 26 and the adding circuit 24. On the other hand, the output currents $I_1$, and $I_2$, of both ends of the PSD 40' are output to an adding circuit 126. Then, the output of the adding circuit 126 and that of the adding circuit 24 are output to the distance calculating circuit 28. Since the other structure and the operations are the same as those of the first embodiment shown in FIG. 4, the explanation thereof is omitted.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. An autofocus setting apparatus for a camera, comprising:

light projecting means for projecting light to an object;

first light receiving means, having first and second output terminals for outputting first and second signals, respectively, for receiving light reflected on the object, an output ratio of said first signal to said second signal changing in accordance with a light receiving point on said light receiving means where said reflected light is received, and a sum of said first and second signals changing in accordance with a quantity of said received light;

second light receiving means, positioned adjacent to said first light receiving means, for receiving said reflected light and for outputting a third signal in accordance with a quantity of received light;

a first calculating circuit means for receiving said first and second signals, and for calculating an object distance on the basis of said light receiving point on said first light receiving means;

a second calculating circuit means for receiving said third signal and the sum of said first and second signals, and for calculating the object distance on the basis of a relationship between the quantity of light received by said first receiving means and the quantity of light received by said second receiving means; and a driving circuit means for driving a projection lens by selectively receiving the output of said first calculating circuit means and the output of said second calculating circuit means.

2. An apparatus according to claim 1, wherein said second light receiving means comprises a silicon photo diode.

3. An apparatus according to claim 1, wherein said second light receiving means comprises a semiconductor position detecting means having two electrodes, and said third signal is a sum signal of the output currents from both electrodes of said semiconductor position detecting means.

4. An autofocus setting apparatus for a camera, comprising:
light projecting means for projecting light to an object;
first light receiving means, having first and second output terminals for outputting first and second signals, respectively, for receiving light reflected on the object, an output ratio of said first signal to said second signal changing in accordance with a light receiving point on said first light receiving means where said reflected light is received, and a sum of said first and second signals changing in accordance with a quantity of said received light;
second light receiving means, positioned adjacent to said first light receiving means, for receiving said reflected light and for outputting a third signal in accordance with a quantity of received light;
a calculating circuit means for calculating an object distance on the basis of said light receiving point on said first light receiving means, which is indicated by the output ratio of said first signal to said second signal, and for calculating the object distance on the basis of a relationship between the quantity of light received by said first receiving means, which is indicated by the sum of said first and second signals, and the quantity of light received by said second receiving means, which is indicated by said third signal; and
a driving circuit means for driving a projection lens by selectively receiving the output of said calculating circuit means.

5. A measuring apparatus for a camera, comprising:
a light projecting means for projecting light to an object;
first light receiving means, having first and second output terminals for outputting first and second signals, respectively, for receiving light reflected on the object, an output ratio of said first signal to said second signal changing in accordance with a light receiving point on said first light receiving means where said reflected light is received, and a sum of said first and second signals changing in accordance with a quantity of said received light;
second light receiving means, positioned adjacent to said first light receiving means, for receiving said reflected light and for outputting a third signal in accordance with a quantity of received light;
a first calculating means for calculating an object distance based on said receiving point on said first light receiving means, which is indicated by the output ratio of said first and second signals;
discriminating means for discriminating whether the output of said first calculating means is longer than a predetermined distance, and for generating an output when it is discriminated that said output of said first calculating means is longer than the predetermined distance; and
a second calculating means for calculating the object distance based on a relationship between the quantity of light received by said first light receiving means, which is indicated by the sum of said first and second signals, and a quantity of light received by said second light receiving means, which is indicated by said third signal.

6. A measuring apparatus for a camera, comprising:
light projecting means for projecting light to an object;
first light receiving means for receiving light reflected on the object and for outputting first and second signals in accordance with a light receiving point and a quantity of said received light;
second light receiving means, positioned adjacent to said first light receiving means, for receiving said reflected light and for outputting a third signal in accordance with a quantity of received light;
adding means for adding said first and second signals;
a first calculating means for calculating an object distance based on said receiving point on said first light receiving means, which is indicated by said first and second signals;
a second calculating means for calculating the object distance based on a relationship between the quantity of light received by said first light receiving means, which is indicated by an output of said adding means, and the quantity of light received by said second light receiving means, which is indicated by said third signal; and
discriminating means for discriminating whether the output of said first calculating means is shorter than a predetermined distance, and for generating an output as a distance value of said first calculating means when it is discriminated that said output of said first calculating means is shorter than the predetermined distance, and for generating an output as a distance value of said second calculating means when it is discriminated that said output of said second calculating means is longer than the predetermined distance.

7. A measuring apparatus for a camera, comprising:
light projecting means for projecting light to an object;
first light receiving means for receiving light reflected on the object and for outputting first and second signals in accordance with a light receiving point and a quantity of said received light;
second light receiving means, positioned adjacent to said first light receiving means, for receiving said reflected light and for outputting a third signal in accordance with a quantity of received light;
adding means for adding said first and second signals;
switching means for switching between a first state in which said first and second signals are input and a second state in which said third signal and the output of said adding means are input;
distance calculating means for calculating an object distance with a first calculation mode wherein said distance calculating means calculates the object distance on the basis of said light receiving point on said first light receiving means, and a second calculation mode wherein said distance calculating means calculates the object distance on the basis of a relationship between a quantity of light received by said first light receiving means and a quantity of light received by said second light receiving means, said calculation modes being selected in accordance with the first state and second states switched by said switching means; and means for changing said distance calculating means to said second calculation mode by operating said switching means when the output of said distance calculating means is input in said first calculation mode and the output is a value corresponding to the distance being longer than a predetermined distance.

8. An autofocus setting apparatus for a camera, comprising:

light projecting means for projecting light to an object;

first light receiving means for receiving light reflected on the object and for outputting first and second signals in accordance with a light receiving point and a quantity of said received light;

second light receiving means, positioned adjacent to said first light receiving means, for receiving said reflected light and for outputting a third signal in accordance with a quantity of received light;

adding means for adding said first and second signals;

calculating means for calculating an object distance in a first distance calculating mode in which said first and second signals are input and the object distance in calculated on the basis of said light receiving point on said first light receiving means and in response to a measuring operation starting signal of said camera, and for calculating an object distance in a second distance calculating mode in which said third signal and the output of said adding means are input and said calculating means calculates these object distances on the basis of a relationship between the quantity of light received by said first light receiving means and the quantity of light received by said second receiving means in a time sequence manner;

reset means for resetting the distance calculated value of said calculating means when the output of said calculating means in said first distance calculating mode is input and the output is longer than a predetermined distance, and for changing the state of said calculating means to the second calculating mode; and focusing means for focusing based on either the calculated distance value in said first distance calculating mode or the calculated distance value in said second distance calculating mode.

9. A focus adjusting apparatus, comprising:

light projecting means for projecting measuring light to an object;

light receiving means for receiving said measuring light reflected on said object, said light receiving means including a first photodetector outputting first and second signal currents whose ratio to an absolute value changes in accordance with a light receiving point, and a second photodetector, positioned adjacent to said first photodetector, and outputting a third signal current whose absolute value changes in accordance with a quantity of receiving light of said reflected light;

adding means for adding said first and second signal currents and for outputting a signal current corresponding to the total amount of receiving light of said first photodetector;

first outputting means for outputting first object distance information based on said light receiving point on said light receiving means, which is indicated by a ratio of said first signal current to said second signal current;

second outputting means for outputting second object distance information based on a proportion of a quantity of light received by said first photodetector to a quantity of light received by said second photodetector, which is indicated by a ratio of said third signal current to said signal current from said adding means;

selecting means for selecting said first object distance information when the object distance obtained by said first outputting means is shorter than a predetermined distance, and for selecting the second distance information when the object distance obtained by said first outputting means is longer than a predetermined distance; and lens driving means for driving a focus of a projection lens to be adjusted in accordance with distance information of the object selected by said selecting means.

10. A focus adjusting apparatus, comprising:

light projecting means for projecting measuring light to an object;

light receiving means for receiving said measuring light reflected on said object, said light receiving means including a first photodetector outputting first and second signal currents whose ratio to an absolute value changes in accordance with a light receiving point, and a second photodetector, positioned adjacent to said first photodetector, and outputting a third signal current whose absolute value changes in accordance with a quantity of receiving light of said reflected light;

adding means for adding said first and second signal currents and for outputting a signal current corresponding to the total amount of receiving light of said first photodetector;

first ratio calculating means for calculating a ratio of said first signal current to said second signal current, and for outputting first ratio calculation information based on said light receiving point on said light receiving means, which is indicated by the ratio calculated by said first ratio calculating means;

second ratio calculating means for calculating a ratio of said third signal current to the signal current from said adding means, and for outputting second ratio calculation information;

discriminating means for discriminating whether or not said object distance is longer than a predetermined distance based on said first ratio calculation information; and focus adjusting means for adjusting a focus of a projection lens based on said first ratio calculation information when said object distance is not longer than the predetermined distance, and for adjusting a focus of the projection lens based on said second ratio calculation information when said object distance is longer than the predetermined distance.

11. A measuring apparatus, comprising:

light projecting means for projecting measuring light to an object;

light receiving means for receiving said measuring light reflected on said object, said light receiving means including a first photodetector outputting first and second signal currents whose ratio to an absolute value changes in accordance with a light receiving point on said light receiving means, and a second photodetector, positioned adjacent to said first photodetector, and outputting a third signal current whose absolute value changes in accordance with a quantity of receiving light of said reflected light;

adding means for adding said first and second signal currents and for outputting a signal current corresponding to the total amount of receiving light of said first photodetector;

ratio calculating means for calculating either a ratio of said first signal current to said second signal current or a ratio of said third current signal to the signal current from said adding means wherein said ratio calculating means first calculates the ratio of said first signal current to said second signal current on the basis of said light receiving point on said light receiving means, discriminates a measuring range of said object based on the result, and calculates again the ratio of said third current signal to the signal current from said adding means on the basis of a proportion of a quantity of light received by said first photodetector to a quantity of light received by said second photodetector only when it is discriminated that said object is at a long distance position; and outputting means for outputting distance information of said object based on the calculation result of said ratio calculating means.

12. A measuring apparatus, comprising:

an infrared light emitting diode for emitting measuring light;

a light projection lens for projecting said measuring light to an object after converging said measuring light;

a light converging lens for converging light reflected on said object;

a photodetector for receiving said reflected light converged by said light converging lens to a point in accordance with a distance of said object, wherein said photodetector includes a position detecting element outputting first and second signal currents whose ratio to an absolute value changes in accordance with a light receiving point, and a photoelectric transfer element outputting a third signal current whose absolute value changes in accordance with a quantity of receiving light, said photoelectric transfer element being arranged adjacent to said position detecting element, and wherein said reflected light is received only when said object is at a relatively long distance position; and object distance calculating means for calculating the object distance based on an output signal of said photodetector, wherein said object distance calculating means discriminates whether said object is on a nearer distance side than a predetermined distance or farther distance side than the predetermined distance from a ratio of said first signal current to said second signal current, which indicates said point on said photodetector, said object distance is calculated form said ratio when it is discriminated that said object is on the nearer distance side, and said object distance is calculated from the ratio of the added value of said first and second signal currents to the third signal current which represents a proportion of a quantity of light received by said position detecting element to a quantity of light received by said photoelectric transfer element.

13. A measuring apparatus, comprising:

an infrared light emitting diode for emitting measuring light;

a light projection lens for projecting said measuring light to an object after converging said measuring light;

a light converging lens for converging light reflected on said object;

a photodetector for receiving said reflected light converged by said light converging lens to a point in accordance with a distance of said object, wherein said photodetector includes a position detecting element outputting first and second signal currents whose ratio to an absolute value changes in accordance with the object distance, and a photoelectric transfer element outputting a third signal current whose absolute value changes in accordance with a quantity of receiving light, said photoelectric transfer element being arranged adjacent to said position detecting element, and said reflected light is received only when said object is at a relatively long distance position; and object distance calculating means for calculating the object distance based on an output signal of said photodetector, wherein said object distance is calculated from a ratio of said first signal current to said second signal current, which indicates said point on said photoconductor when said object is on the nearer distance side than a predetermined distance, and said object distance is calculated from the ratio of the added value of said first and second signal currents to the third signal current, which indicates a proportion of a quantity of light received by said position detecting element to a quantity of light received by said photoelectric transfer element.

* * * * *